United States Patent
Takahashi et al.

(10) Patent No.: US 12,452,871 B2
(45) Date of Patent: Oct. 21, 2025

(54) PRIORITIZATION CONFIGURATION IN TERMINAL AND BASE STATION

(71) Applicant: NTT DOCOMO, INC., Tokyo (JP)

(72) Inventors: Hideaki Takahashi, Tokyo (JP); Tianyang Min, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 306 days.

(21) Appl. No.: 17/764,830

(22) PCT Filed: Oct. 3, 2019

(86) PCT No.: PCT/JP2019/039221
§ 371 (c)(1),
(2) Date: Mar. 29, 2022

(87) PCT Pub. No.: WO2021/064973
PCT Pub. Date: Apr. 8, 2021

(65) Prior Publication Data
US 2022/0322420 A1    Oct. 6, 2022

(51) Int. Cl.
*H04W 72/04* (2023.01)
*H04L 1/08* (2006.01)
*H04W 72/23* (2023.01)
*H04W 72/566* (2023.01)
*H04W 88/08* (2009.01)
*H04W 80/02* (2009.01)

(52) U.S. Cl.
CPC ............. *H04W 72/23* (2023.01); *H04L 1/08* (2013.01); *H04W 72/569* (2023.01); *H04W 80/02* (2013.01)

(58) Field of Classification Search
CPC ... H04W 72/23; H04W 72/569; H04W 80/02; H04W 72/1268; H04L 1/08; H04L 1/1822; H04L 1/1887
USPC ....................................................... 370/329
See application file for complete search history.

(56) References Cited

U.S. PATENT DOCUMENTS

2012/0106477 A1\*   5/2012  Kwon ................. H04W 52/365
                                                                370/328

OTHER PUBLICATIONS

Huawei (R2-1911209, "Discussion on HARQ process collision between CG and DG", Aug. 26-30, 2019) (Year: 2019).\*
LG (R2-1907878, Prioritization rule for DG/CG and CG/CG conflicts, May 13-17, 2019 (Year: 2019).\*
R2-1911209, "Discussion on HARQ process collision between CG and DG", Aug. 26-30, 2019, provided in the last office action (Year: 2019).\*
CATT (Prioritization rules for CG/DG and CG/CG collisions, R2-1903143, Apr. 8-12, 2019 (Year: 2019).\*

(Continued)

*Primary Examiner* — Maharishi V Khirodhar
(74) *Attorney, Agent, or Firm* — Osha Bergman Watanabe & Burton LLP (57) ABSTRACT

A terminal is disclosed including a reception section that receives a higher layer parameter on a configuration of media access control (MAC); and a control section that ignores an uplink (UL) grant for which a configuration on prioritization is performed by the higher layer parameter, when the UL grant is not a prioritized UL grant in a case of retransmission in MAC. In other aspects, a radio communication method and a radio communication system are also disclosed.

6 Claims, 2 Drawing Sheets

(56) References Cited

OTHER PUBLICATIONS

OPPO( "Intra-Prioritization involving configured grant", R2-1910020) (Year: 2019).*
International Search Report issued in PCT/JP2019/039221 on Apr. 21, 2020 (5 pages).
Written Opinion of the International Searching Authority issued in PCT/JP2019/039221 on Apr. 21, 2020 (3 pages).
ETSI MCC; "Report of 3GPP TSG RAN2#107 meeting, Prague, Czech Republic"; 3GPP TSG-RAN WG2 meeting #107bis, R1-1912001; Prague, Czech Republic; Aug. 26-30, 2019 (317 pages).
NTT Docomo, Inc.; "Report for email discussion [106#53][IIOT] Handling of overlapping PUSCH grant prioritization"; 3GPP TSG-RAN2 Meeting #107, R2-1911472; Prague, Czech Republic; Aug. 26-30, 2019 (47 pages).
Office Action issued in the counterpart Japanese Patent Application No. 2021-550912, mailed on Feb. 21, 2023 (6 pages).
Office Action issued in the counterpart Japanese Patent Application No. 2021-550912, mailed on Sep. 27, 2022 (8 pages).
LG Electronics Inc.; "Prioritization for overlapping PUSCH resources"; 3GPP TSG-RAN WG2 Meeting #107, R2-1911203; Prague, Czech; Aug. 26-30, 2019 (2 pages).
LG Electronics; "Summary#4 of 7.2.6.7 Others"; 3GPP TSG RAN WG1 #98, R1-1909851; Prague, Czech Republic; Aug. 26-30, 2019 (17 pages).
Office Action Issued in Korean Application No. 10-2022-7009319, mailed Mar. 10, 2025 (10 pages).

* cited by examiner

PRIORITIZATION CONFIGURATION IN TERMINAL AND BASE STATION

TECHNICAL FIELD

The present disclosure relates to a terminal and a base station.

BACKGROUND ART

Long Term Evolution (LTE) has been specified to further achieve a higher data rate and lower latency in a Universal Mobile Telecommunications System (UMTS) network. Future systems of LTE have also been studied to further achieve a broader band and higher speed from LTE. Examples of the future systems of LTE include systems called LTE-Advanced (LTE-A), Future Radio Access (FRA), 5th generation mobile communication system (5G), 5G plus (5G+), Radio Access Technology (New-RAT) New Radio (NR), and the like.

Studies have been carried out on providing data prioritization to, for example, transmission data in radio communication systems such as NR.

CITATION LIST

Non-Patent Literature

NPL 1
3GPP RAN2 #107, chairman's note

SUMMARY OF INVENTION

Technical Problem

There is room for consideration with regard to the control, scheduling for example, in providing the data prioritization to transmission data.

An object of the present disclosure is to implement an appropriate operation (e.g., scheduling) in providing the data prioritization to transmission data.

Solution to Problem

A terminal according to one aspect of the present disclosure includes: a control section that generates a second uplink data deprioritized to a first uplink data when the terminal receives rescheduling information; and a transmission section that transmits the 10 second uplink data through a channel in accordance with a grant.

Advantageous Effects of Invention

According to the present disclosure, it is possible to implement an appropriate operation (e.g., scheduling) in providing the data prioritization to transmission data.

DESCRIPTION OF EMBODIMENTS

Hereinafter, an embodiment will be described with reference to the drawings as appropriate. The same elements throughout the entire present specification are denoted by the same reference numerals unless otherwise noted. The matters described below together with the accompanying drawings are for describing an exemplary embodiment and not for indicating the sole embodiment. For example, in a case where an order of operations is indicated in the embodiment, the order of operations may be appropriately changed as long as there is no inconsistency as a whole operation.

In a case where a plurality of embodiments and/or modifications are exemplified, some configurations, functions and/or operations in a given embodiment and/or modification may be included in another embodiment and/or modification as long as there is no inconsistency, or may be replaced with corresponding configurations, functions and/ or operations of another embodiment and/or modification.

Further, a detailed description more than necessary may be omitted in the embodiment. For example, a detailed description of a publicly-known or well-known technical matter may be omitted to facilitate the understanding of those skilled in the art by avoiding unnecessary redundancy of a description and/or an ambiguous technical matter or concept. Further, a duplicate description for a substantially identical configuration, function and/or operation may be omitted.

The accompanying drawings and the following description are provided to aid in the understanding of the embodiment, and are not intended to limit the subject matter described in the claims. Further, the terms used in the following description may also be appropriately replaced with other terms to help those skilled in the art understand.

<Knowledge Leading to the Present Disclosure>

The following are agreements in RAN2 #107 in 3GPP.

One Protocol Data Unit (PDU) is generated in the case where no PDU has been generated at all yet and there are two grants, one of which is de-prioritized.

RAN2 assumes that the Medium Access Control Protocol Data Unit (MAC PDU) recovery method in grant prioritization could be reused for a conflict between Physical Uplink Shared Channel (PUSCH) and Scheduling Request (SR).

MAC PDU is not generated when SR is triggered before a MAC PDU assembly, Physical Uplink Control Channel (PUCCH) for the transmission occasion of SR conflicts with Uplink Shared Channel (UL-SCH) of MAC PDU, and the UL-SCH transmission is deprioritized to PUCCH transmission. Neither PUCCH for the transmission occasion of SR nor UL-SCH of MAC PDU is transmitted due to the "conflict".

According to the agreements described above, data of the unit referred to as MAC PDU is not generated in a terminal when, for example, the data is deprioritized. Herein, the data of low priority may be referred to as deprioritized data. Deprioritized data may be replaced with deprioritized MAC PDU, deprioritized PDU, lower priority data, lower priority MAC PDU, or lower priority PDU.

Note that the two grants in the agreements described above may be referred to as Dynamic Grant (DG) and Configured Grant (CG). PUSCH scheduled by DG may be referred to as DG PUSCH. PUSCH scheduled by CG may be referred to as CG PUSCH.

Release 15 (Rel. 15) assumes that DG PUSCH is prioritized over CG PUSCH. Thus, the data of DG is prioritized when, for example, DG and CG collide with each other (when, for example, DG PUSCH and CG PUSCH collide with each other).

In Release 16 (Rel. 16), the prioritization between CG PUSCH and DG PUSCH is configured by MAC, for example. Thus, the data of CG may possibly be prioritized, for example, when DG and CG collide with each other. The data of CG is prioritized when, for example, the data to be transmitted by CG PUSCH is data of Ultra-Reliable and Low Latency Communications (URLLC).

Note that the data prioritization by MAC may be based on Logical Channel Prioritization. For example, data prioritized according to the logical channel priority (e.g., MAC PDU) is generated when the MAC processing timeline can afford. MAC generates a single MAC PDU prioritizing either DG or CG when DG and CG collide with each other and no MAC PDU has been generated. The generated MAC PDU is transmitted to a lower Physical layer (PHY). When, for example, high priority data reaches MAC immediately after the single MAC PDU is generated, MAC can generate MAC PDU of the high priority data. In this case, a base station cannot identify whether the terminal has generated a single MAC PDU or two MAC PDUs, thereby possibly causing misalignment of recognition or assumption between the base station and the terminal.

As described above, the misalignment of recognition or assumption may occur between the base station and the terminal regarding whether the terminal has generated a single MAC PDU or two MAC PDUs, in other words, whether low priority data (e.g., deprioritized MAC PDU) has generated, for example. This misalignment may possibly affect the determination of scheduling (or rescheduling) in the base station.

The present embodiment explains a technology (e.g., a terminal and a base station) to implement an appropriate scheduling even when the misalignment of recognition or assumption may occur between the base station and the terminal regarding whether the low priority data (e.g., deprioritized MAC PDU) has generated.

<Configuration of Base Station>

Figure 1:
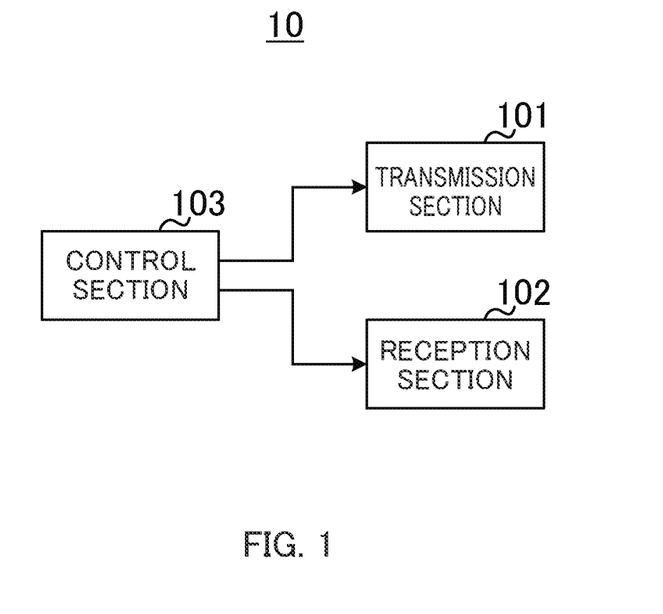
FIG. 1 is a block diagram illustrating an exemplary configuration of a base station.

FIG. 1 is a block diagram illustrating an example of a configuration of base station 10. Base station 10 includes, for example, transmission section 101, reception section 102, and control section 103. Base station 10 communicates by radio with terminal 20 (see FIG. 2).

Transmission section 101 transmits a downlink (DL) signal to terminal 20. For example, transmission section 101 transmits the DL signal under the control of control section 103. The DL signal may include, for example, information indicating scheduling relating to signal transmission of terminal 20 (for example, a UL grant), and may include control information (for example, Downlink Control Information (DCI)).

Reception section 102 receives an uplink (UL) signal transmitted from terminal 20. For example, reception section 102 receives the UL signal under the control of control section 103.

Control section 103 controls communication operations of base station 10 including transmission processing of transmission section 101 and reception processing of reception section 102.

For example, control section 103 receives data, control information and/or the like from a higher layer, and outputs the received data and/or the like to transmission section 101. Further, control section 103 outputs data, control information and/or the like received from reception section 102 to a higher layer.

<Configuration of Terminal>

Figure 2:
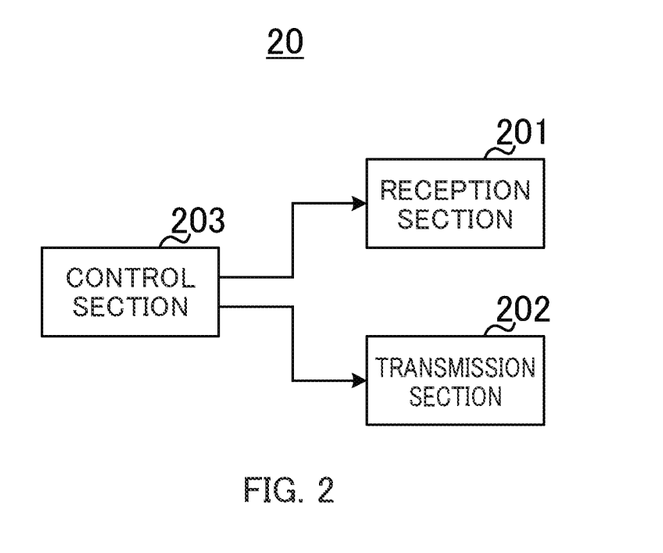
FIG. 2 is a block diagram illustrating an exemplary configuration of a terminal.

FIG. 2 is a block diagram illustrating an exemplary configuration of terminal 20. Terminal 20 includes, for example, reception section 201, transmission section 202, and control section 203. Terminal 20 communicates by radio with, for example, base station 10.

Reception section 201 receives a DL signal transmitted from base station 10. For example, reception section 201 receives the DL signal under the control of control section 203.

Transmission section 202 transmits a UL signal to base station 10. For example, transmission section 202 transmits the UL signal under the control of control section 203. For example, transmission section 202 uses DG PUSCH and/or CG PUSCH to transmit the UL signal.

Control section 203 controls communication operations of terminal 20 including reception processing of reception section 201 and transmission processing of transmission section 202. For example, control section 203 receives data, control information and/or the like from a higher layer, and outputs the received data and/or the like to transmission section 202. Further, control section 203 outputs, for example, data, control information and/or the like received from reception section 201 to a higher layer.

<About DG PUSCH>

Next, two cases regarding the above-mentioned misalignment will be described, the cases possibly occurring when terminal 20 uses DG PUSCH as a resource.

<Case 1 of DG PUSCH>

Case 1 is a case that terminal 20 does not generate deprioritized data although terminal 20 has properly decoded a UL grant, and base station 10 presumes (recognizes, or assumes) that deprioritized data has been generated in terminal 20.

<Case 2 of DG PUSCH>

Case 2 is a case that terminal 20 generates deprioritized data and terminal 20 stores (or maintains) the data (or when the data get stuck) in an HARQ buffer for the associated HARQ process, and base station 10 presumes (recognizes, or assumes) that no deprioritized data has been generated in terminal 20.

In Case 1 of DG PUSCH, terminal 20 does not generate the deprioritized data, but maintains the UL grant received from an HARQ entity according to the present specification (see, for example, section 5.4.2.1 of TS 38.321). Base station 10 then transmits DCI for rescheduling for the associated Hybrid Automatic Repeat reQuest (HARQ) process without toggling the value of a New Data Indicator (NDI). In this Case 1, for example, the conceivable behaviours (i.e., operations) of terminal 20 that has received the UL grant are in two patterns according to the present specification (for example, section 5.4.2.1 of TS 38.321).

The first pattern is that terminal 20 ignores the UL grant. This is because terminal 20 does not generate the deprioritized data and no data is maintained in the HARQ buffer.

The second pattern is that terminal 20 transfers HARQ information (e.g., a redundancy version) of a Transport Block (TB), and the UL grant to the identified HARQ process, and indicates a trigger of retransmission to the identified HARQ process.

The second pattern from the two patterns described above can reduce the overhead of the UL grant. The behaviour of terminal 20, however, may be either one of the two pattern.

In Case 2 of DG PUSCH, when base station 10 presumes that no deprioritized data has been generated in terminal 20, the deprioritized data is, for example, stuck in the associated HARQ buffer. Terminal 20 flushes the buffer and generates new transmission data until base station 10 transmits the UL grant for the associated HARQ process with a toggled value of NDI (i.e., new transmission), thereby causing little negative effect.

<About CG PUSCH>

Next, two cases regarding the above-mentioned misalignment will be described, the cases possibly occurring when terminal 20 uses CG PUSCH as a resource.

<Case 1 of CG PUSCH>

Case 1 of CG PUSCH is a case that terminal 20 does not generate deprioritized data, and base station 10 presumes that deprioritized data has been generated in terminal 20.

<Case 2 of CG PUSCH>

Case 2 of CG PUSCH is a case that terminal 20 generates deprioritized data and maintains the data in an HARQ buffer for the associated HARQ process, and base station 10 presumes that no deprioritized data has been generated in terminal 20.

In Case 1 of CG PUSCH, base station 10 schedules retransmission with NDI=1 according to the present specification. Terminal 20 ignores the UL grant since the HARQ buffer of the identified process is empty. This does not make a great negative effect, but the overhead of the UL grant possibly increases (or the UL grant is possibly wasted).

In Case 2 of CG PUSCH, base station 10 does not have to transmit the UL grant for rescheduling with NDI=1 scrambled by Configured Scheduling-Radio Network Temporary Identifier (CS-RNTI). The deprioritized data is stuck in the associated HARQ buffer, similarly to Case 2 of DG PUSCH.

As described above, in Case 1 of both DG PUSCH and CG PUSCH, terminal 20 does not generate the deprioritized data and base station 10 recognizes or assumes the deprioritized data is generated in terminal 20. For such a case, a complimentary operation is conceivable to the operations of terminal 20 and base station 10 described above.

For example, base station 10 presumes (assumes, or determines) that terminal 20 has generated the deprioritized data regardless of whether terminal 20 has actually generated the deprioritized data. Base station 10 then transmits DCI for rescheduling. For example, when the behaviour of terminal 20 is as in Case 1, that is, when terminal 20 does not generate the deprioritized data, base station 10 may presume that terminal 20 has generated the deprioritized data regardless of whether terminal 20 has actually generated the deprioritized data.

In addition, base station 10 may always transmit the DCI for rescheduling, for example, with the presumption that terminal 20 has generated the deprioritized data regardless of whether the channel used by terminal 20 for data transmission is DG PUSCH or CG PUSCH. Further, the transmission of the DCI for rescheduling may, for example, be blindly performed.

In this case, control section 103 of base station 10 determines that the deprioritized data has been generated in terminal 20 regardless of whether the deprioritized data has been generated in terminal 20, and generates the DCI for rescheduling. Transmission section 101 of base station 10 then transmits the DCI generated according to the determination of control section 103 to terminal 20. Control section 203 of terminal 20 generates the deprioritized data in the case of receiving the DCI for rescheduling. Transmission section 202 of terminal 20 then transmits the generated deprioritized data through a channel (e.g., DG PUSCH or CG PUSCH) according to the grant.

Note that the deprioritized data may correspond to a second uplink data deprioritized to a first uplink data. Additionally, the DCI for rescheduling may correspond to an example of rescheduling information.

Further, determining that the deprioritized data has been generated in terminal 20 regardless of whether the deprioritized data has been generated in terminal 20 may correspond to determining that the deprioritized data has been generated in terminal 20 in both cases of the deprioritized data having been generated and having not been generated in terminal 20.

According to the embodiment described above, terminal 20 can implement an appropriate operation (e.g., scheduling) in providing the data prioritization to the data. Base station 10 can also implement an appropriate operation (e.g., scheduling) in providing the data prioritization to the data.

Note that the embodiment described above shows examples of configuring prioritization on data transmission (e.g., grant prioritization and/or data prioritization) in DG PUSCH and CG PUSCH, but the present disclosure is not limited thereto. For example, the prioritization on data transmission may be configured between two DG PUSCHs. The prioritization on data transmission may also be configured between two CG PUSCHs. Further, the prioritization on data transmission may be configured among more than three PUSCHs (DG PUSCHs and/or CG PUSCHs).

In addition, the above embodiment has been described with an example of data prioritization, but the present disclosure is not limited thereto. The priority may be provided, for example, between data and control information or among more than two different pieces of control information.

Further, the above embodiment has been described with examples of DG PUSCH and CG PUSCH, but the present disclosure is not limited thereto. The present disclosure may be applied to channels other than DG PUSCH and CG PUSCH.

(Hardware Configuration)

Note that, the block diagrams used to describe the above embodiment illustrate blocks on the basis of functions. These functional blocks (component sections) are implemented by any combination of at least hardware or software. A method for implementing the functional blocks is not particularly limited. That is, the functional blocks may be implemented using one physically or logically coupled apparatus. Two or more physically or logically separate apparatuses may be directly or indirectly connected (for example, via wires or wirelessly), and the plurality of apparatuses may be used to implement the functional blocks. The functional blocks may be implemented by combining software with the one apparatus or the plurality of apparatuses described above.

The functions include, but not limited to, judging, deciding, determining, computing, calculating, processing, deriving, investigating, searching, confirming, receiving, transmitting, outputting, accessing, solving, selecting, choosing, establishing, comparing, supposing, expecting, regarding, broadcasting, notifying, communicating, forwarding, configuring, reconfiguring, allocating, mapping, assigning, and the like. For example, a functional block (component section) that functions to achieve transmission is referred to as "transmitting unit" or "transmitter." The methods for implementing the functions are not limited specifically as described above.

Figure 3:
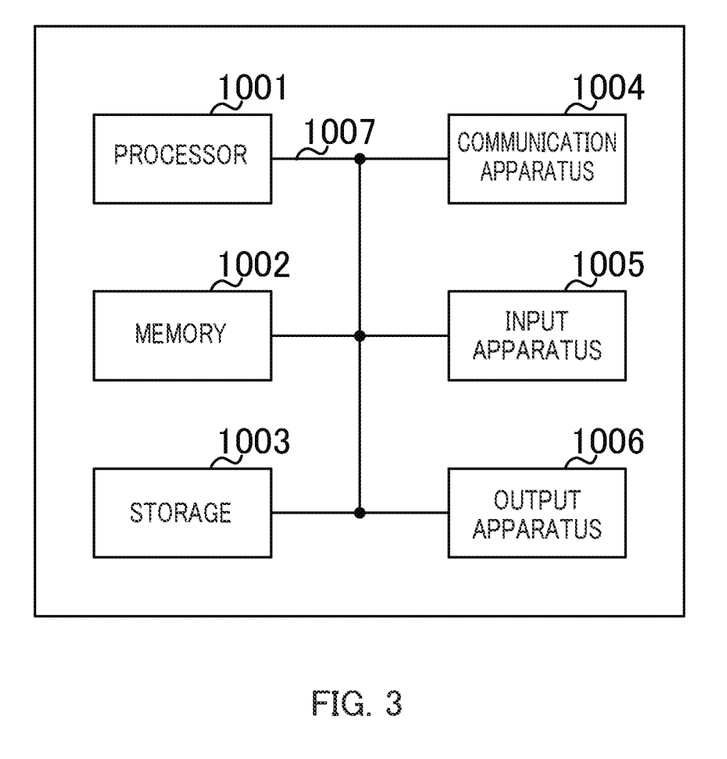
FIG. 3 illustrates an exemplary hardware configuration of the base station and the terminal.

For example, the base station, the terminal, and the like according to an embodiment of the present disclosure may function as a computer that executes processing of a wireless communication method of the present disclosure. FIG. 3 illustrates one example of hardware configurations of the base station and of the terminal according to one embodiment of the present disclosure. Base station 10 and terminal 20 described above may be physically constituted as a computer apparatus including processor 1001, memory 1002, storage 1003, communication apparatus 1004, input apparatus 1005, output apparatus 1006, bus 1007, and the like.

Note that, the term "apparatus" in the following description can be replaced with a circuit, a device, a unit, or the like. The hardware configurations of base station 10 and of terminal 20 may include one apparatus or a plurality of apparatuses illustrated in FIG. 3, or may not include part of the apparatuses.

The functions of base station 10 and terminal 20 are implemented by predetermined software (program) loaded into hardware such as processor 1001, memory 1002, and the like, according to which processor 1001 performs the arithmetic and controls communication performed by communication apparatus 1004 or at least one of reading and writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, control section 103 and control section 203 as described above may be implemented by processor 1001.

Processor 1001 reads a program (program code), a software module, data, and the like from at least one of storage 1003 and communication apparatus 1004 to memory 1002 and performs various types of processing according to the program (program code), the software module, the data, and the like. As the program, a program for causing the computer to perform at least a part of the operation described in the above embodiment is used. For example, control section 103 of base station 10 or control section 203 of terminal 20 may be implemented by a control program stored in memory 1002 and operated by processor 1001, and the other functional blocks may also be implemented in the same way. While it has been described that the various types of processing as described above are performed by one processor 1001, the various types of processing may be performed by two or more processors 1001 at the same time or in succession. Processor 1001 may be implemented by one or more chips. Note that, the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the wireless communication method according to an embodiment of the present disclosure.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be, for example, a database, a server or other appropriate media including at least one of memory 1002 and storage 1003.

Communication apparatus 1004 is hardware (transmission and reception device) for communication between computers through at least one of wired and wireless networks and is also called, for example, a network device, a network controller, a network card, or a communication module. Communication apparatus 1004 may be configured to include a high frequency switch, a duplexer, a filter, a frequency synthesizer, and the like in order to achieve at least one of Frequency Division Duplex (FDD) and Time Division Duplex (TDD), for example. For example, transmission section 101, reception section 102, reception section 201, and transmission section 202, and the like as described above may be realized by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which makes outputs to the outside. Note that, input apparatus 1005 and output apparatus 1006 may be integrated (for example, a touch panel).

The apparatuses, such as processor 1001, memory 1002 and the like, are connected by bus 1007 for communication of information. Bus 1007 may be configured using a single bus or using buses different between each pair of the apparatuses.

Furthermore, base station 10 and terminal 20 may include hardware, such as a microprocessor, a digital signal processor (DSP), an ASIC (Application Specific Integrated Circuit), a PLD (Programmable Logic Device), and an FPGA (Field Programmable Gate Array), and the hardware may implement part or all of the functional blocks. For example, processor 1001 may be implemented using at least one of these pieces of hardware.

(Notification and Signaling of Information)

The notification of information is not limited to the aspects or embodiment described in the present disclosure, and the information may be notified by another method. For example, the notification of information may be carried out by one or a combination of physical layer signaling (for example, DCI (Downlink Control Information) and UCI (Uplink Control Information)), upper layer signaling (for example, RRC (Radio Resource Control) signaling, MAC (Medium Access Control) signaling, notification information (MIB (Master Information Block) and SIB (System Information Block))), and other signals. The RRC signaling may be called an RRC message and may be, for example, an RRC connection setup message, an RRC connection reconfiguration message, or the like.

(Application System)

The aspects and embodiment described in the present disclosure may be applied to at least one of a system using LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), or other appropriate systems and a next-generation system extended based on the above systems. Additionally or alternatively, a combination of two or more of the systems (e.g., a combination of at least one of LTE and LTE-A and 5G) may be applied.

(Processing Procedure and the Like)

The orders of the processing procedures, the sequences, the flow charts, and the like of the aspects and embodiment described in the present disclosure may be changed as long as there is no contradiction. For example, elements of various steps are presented in exemplary orders in the methods described in the present disclosure, and the methods are not limited to the presented specific orders.

(Operation of Base Station)

Specific operations which are described in the present disclosure as being performed by the base station may sometimes be performed by an upper node depending on the situation. Various operations performed for communication with a terminal in a network constituted by one network node or a plurality of network nodes including a base station can be obviously performed by at least one of the base station and a network node other than the base station (examples include, but not limited to, MME and S-GW). Although there is one network node in addition to the base station in the case illustrated above, a plurality of other network nodes may be combined (for example, MME and S-GW).

(Direction of Input and Output)

The information or the like (see the item of "Information and Signals") can be output from a higher layer (or a lower layer) to a lower layer (or a higher layer). The information or the like may be input and output through a plurality of network nodes.

(Handling of Input and Output Information and the Like)

The input and output information and the like may be saved in a specific place (for example, memory) or may be managed using a management table. The input and output information and the like can be overwritten, updated, or additionally written. The output information and the like may be deleted. The input information and the like may be transmitted to another apparatus.

(Determination Method)

The determination may be made based on a value expressed by one bit (0 or 1), based on a Boolean value (true or false), or based on comparison with a numerical value (for example, comparison with a predetermined value).

(Software)

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, the information and the like may be transmitted and received through a transmission medium. For example, when the software is transmitted from a website, a server, or another remote source by using at least one of a wired technique (e.g., a coaxial cable, an optical fiber cable, a twisted pair, and a digital subscriber line (DSL)) and a wireless technique (e.g., an infrared ray and a microwave), the at least one of the wired technique and the wireless technique is included in the definition of the transmission medium.

(Information and Signals)

The information, the signals, and the like described in the present disclosure may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that, the terms described in the present disclosure and the terms necessary to understand the present disclosure may be replaced with terms with the same or similar meaning. For example, at least one of the channel and the symbol may be a signal (signaling). The signal may be a message. The component carrier (CC) may be called a carrier frequency, a cell, a frequency carrier, or the like.

("System" and "Network")

The terms "system" and "network" used in the present disclosure can be interchangeably used.

(Names of Parameters and Channels)

The information, the parameters, and the like described in the present disclosure may be expressed using absolute values, using values relative to predetermined values, or using other corresponding information. For example, radio resources may be indicated by indices.

The names used for the parameters are not limitative in any respect. Furthermore, the numerical formulas and the like using the parameters may be different from the ones explicitly disclosed in the present disclosure. Various channels (for example, PUCCH and PDCCH) and information elements can be identified by any suitable names, and various names allocated to these various channels and information elements are not limitative in any respect.

(Base Station (Wireless Base Station))

The terms "base station (BS)", "wireless base station", "fixed station", "NodeB", "eNodeB (eNB)", "gNodeB (gNB)", "access point", "transmission point", "reception point", "transmission/reception point", "cell", "sector", "cell group", "carrier", and "component carrier" may be used interchangeably in the present disclosure. The base station may be called a macro cell, a small cell, a femtocell, or a pico cell.

The base station can accommodate one cell or a plurality of (for example, three) cells. When the base station accommodates a plurality of cells, the entire coverage area of the base station can be divided into a plurality of smaller areas, and each of the smaller areas can provide a communication service based on a base station subsystem (for example, small base station for indoor (RRH: Remote Radio Head)). The term "cell" or "sector" denotes part or all of the coverage area of at least one of the base station and the base station subsystem that perform the communication service in the coverage.

(Terminal)

The terms "Mobile Station (MS)", "user terminal", "User Equipment (UE)", and "terminal" may be used interchangeably in the present disclosure.

The mobile station may be called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or by some other appropriate terms.

(Base Station/Mobile Station)

At least one of the base station and the mobile station may be called a transmission apparatus, a reception apparatus, a communication apparatus, or the like. Note that, at least one of the base station and the mobile station may be a device mounted in a mobile entity, the mobile entity itself, or the like. The mobile entity may be a vehicle (e.g., an automobile or an airplane), an unmanned mobile entity (e.g., a drone or an autonomous vehicle), or a robot (a manned-type or unmanned-type robot). Note that, at least one of the base station and the mobile station also includes an apparatus that does not necessarily move during communication operation. For example, at least one of the base station and the mobile station may be IoT (Internet of Things) equipment such as a sensor.

The base station in the present disclosure may also be replaced with the user terminal. For example, the aspects and embodiment of the present disclosure may find application in a configuration that results from replacing communication between the base station and the user terminal with communication between multiple user terminals (such communication may, e.g., be referred to as D2D (Device-to-Device), V2X (Vehicle-to-Everything), or the like). In this case, terminal 20 may be configured to have the functions that base station 10 described above has. The wordings "uplink" and "downlink" may be replaced with a corresponding wording for inter-terminal communication (for example, "side"). For example, an uplink channel, a downlink channel, and the like may be replaced with a side channel.

Similarly, the terminal in the present disclosure may be replaced with the base station. In this case, base station 10 is configured to have the functions that terminal 20 described above has.

(Meaning and Interpretation of Terms)

As used herein, the term "determining" may encompass a wide variety of actions. For example, "determining" may be regarded as judging, calculating, computing, processing, deriving, investigating, looking up, searching (or, search or inquiry) (e.g., looking up in a table, a database or another data structure), ascertaining and the like. Furthermore, "determining" may be regarded as receiving (for example, receiving information), transmitting (for example, transmitting information), inputting, outputting, accessing (for example, accessing data in a memory) and the like. Also, "determining" may be regarded as resolving, selecting, choosing, establishing, comparing and the like. That is, "determining" may be regarded as a certain type of action related to determining. Also, "determining" may be replaced with "assuming", "expecting", "considering", and the like.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. For example, "connected" may be replaced with "accessed". When the terms are used in the present disclosure, two elements can be considered to be "connected" or "coupled" to each other using at least one of one or more electrical wires, cables, and printed electrical connections or using electromagnetic energy with a wavelength of a radio frequency domain, a microwave domain, an optical (both visible and invisible) domain, or the like that are non-limiting and non-inclusive examples.

The reference signal can also be abbreviated to an RS and may also be called a pilot depending on the applied standard.

The description "based on" used in the present disclosure does not mean "based only on," unless otherwise specified. In other words, the description "based on" means both of "based only on" and "based at least on".

Any reference to elements by using the terms "first", "second" and the like that are used in the present disclosure does not generally limit the quantities of or the order of these elements. The terms can be used as a convenient method of distinguishing between two or more elements in the present disclosure. Therefore, reference to first and second elements does not mean that only two elements can be employed, or that the first element has to precede the second element somehow.

The "section" in the configuration of each apparatus described above may be replaced with "means," "circuit," "device," or the like.

In a case where terms "include", "including", and their modifications are used in the present disclosure, these terms are intended to be inclusive like the term "comprising". Further, the term "or" used in the present disclosure is not intended to be an exclusive or.

The radio frame may be constituted by one frame or a plurality of frames in the time domain. The one frame or each of the plurality of frames may be called a subframe in the time domain. The subframe may be further constituted by one slot or a plurality of slots in the time domain. The subframe may have a fixed time length (e.g., 1 ms) independent of numerology.

The numerology may be a communication parameter that is applied to at least one of transmission and reception of a certain signal or channel. The numerology indicates, for example, at least one of SubCarrier Spacing (SCS), a bandwidth, a symbol length, a cyclic prefix length, Transmission Time Interval (TTI), the number of symbols per TTI, a radio frame configuration, specific filtering processing that is performed by a transmission and reception apparatus in the frequency domain, specific windowing processing that is performed by the transmission and reception apparatus in the time domain, and the like.

The slot may be constituted by one symbol or a plurality of symbols (e.g., OFDM (Orthogonal Frequency Division Multiplexing) symbol, SC-FDMA (Single Carrier-Frequency Division Multiple Access) symbol, or the like) in the time domain. The slot may also be a time unit based on the numerology.

The slot may include a plurality of mini-slots. Each of the mini slots may be constituted by one or more symbols in the time domain. Furthermore, the mini-slot may be referred to as a subslot. The mini-slot may be constituted by a smaller number of symbols than the slot. A PDSCH (or a PUSCH) that is transmitted in the time unit that is greater than the mini-slot may be referred to as a PDSCH (or a PUSCH) mapping type A. The PDSCH (or the PUSCH) that is transmitted using the mini-slot may be referred to as a PDSCH (or PUSCH) mapping type B.

The radio frame, the subframe, the slot, the mini-slot, and the symbol indicate time units in transmitting signals. The radio frame, the subframe, the slot, the mini-slot, and the symbol may be called by other corresponding names.

For example, one subframe, a plurality of continuous subframes, one slot, or one mini-slot may be called a Transmission Time Interval (TTI). That is, at least one of the subframe and the TTI may be a subframe (1 ms) in the existing LTE, a duration (for example, 1 to 13 symbols) that is shorter than 1 ms, or a duration that is longer than 1 ms. Note that, a unit that represents the TTI may be referred to as a slot, a mini-slot or the like instead of a subframe.

Here, the TTI, for example, refers to a minimum time unit for scheduling in wireless communication. For example, in an LTE system, the base station performs scheduling for allocating a radio resource (a frequency bandwidth, a transmit power, and the like that can be used in each user terminal) on the basis of TTI to each user terminal. Note that, the definition of TTI is not limited to this.

The TTI may be a time unit for transmitting a channel-coded data packet (a transport block), a code block, or a codeword, or may be a unit for processing such as scheduling and link adaptation. Note that, when the TTI is assigned, a time section (for example, the number of symbols) to which the transport block, the code block, the codeword or the like is actually mapped may be shorter than the TTI.

Note that, in a case where one slot or one mini-slot is referred to as the TTI, one or more TTIs (that is, one or more slots or one or more mini-slots) may be a minimum time unit for the scheduling. Furthermore, the number of slots (the number of mini-slots) that make up the minimum time unit for the scheduling may be controlled.

A TTI that has a time length of 1 ms may be referred to as a usual TTI (a TTI in LTE Rel. 8 to LTE Rel. 12), a normal TTI, a long TTI, a usual subframe, a normal subframe, a long subframe, a slot, or the like. A TTI that is shorter than the usual TTI may be referred to as a shortened TTI, a short TTI, a partial TTI (or a fractional TTI), a shortened subframe, a short subframe, a mini-slot, a subslot, a slot, or the like.

Note that, the long TTI (for example, the usual TTI, the subframe, or the like) may be replaced with the TTI that has a time length which exceeds 1 ms, and the short TTI (for example, the shortened TTI or the like) may be replaced with a TTI that has a TTI length which is less than a TTI length of the long TTI and is equal to or longer than 1 ms.

A resource block (RB) is a resource allocation unit in the time domain and the frequency domain, and may include one or more contiguous subcarriers in the frequency domain. The number of subcarriers that are included in the RB may be identical regardless of the numerology, and may be 12, for example. The number of subcarriers that are included in the RB may be determined based on the numerology.

In addition, the time domain of the RB may include one symbol or a plurality of symbols in the time domain, and may have a length of one slot, one mini-slot, one subframe, or one TTI. One TTI and one subframe may be constituted by one resource block or a plurality of resource blocks.

Note that, one or more RBs may be referred to as a Physical Resource Block (PRB: Physical RB), a Sub-Carrier Group (SCG), a Resource Element Group (REG), a PRB pair, an RB pair, or the like.

In addition, the resource block may be constituted by one or more Resource Elements (REs). For example, one RE may be a radio resource region that is one subcarrier and one symbol.

A bandwidth part (BWP) (which may be referred to as a partial bandwidth or the like) may represent a subset of contiguous common RBs (common resource blocks) for certain numerology in a certain carrier. Here, the common RBs may be identified by RB indices that use a common reference point of the carrier as a reference. The PRB may be defined by a certain BWP and may be numbered within the BWP.

The BWP may include a BWP for UL (UL BWP) and a BWP for DL (DL BWP). An UE may be configured with one or more BWPs within one carrier.

At least one of the configured BWPs may be active, and the UE does not have to assume transmission/reception of a predetermined signal or channel outside the active BWP. Note that, "cell", "carrier" and the like in the present disclosure may be replaced with "BWP".

Structures of the radio frame, the subframe, the slot, the mini-slot, the symbol, and the like are described merely as examples. For example, the configuration such as the number of subframes that are included in the radio frame, the number of slots per subframe or radio frame, the number of mini-slots that are included within the slot, the numbers of symbols and RBs that are included in the slot or the mini-slot, the number of subcarriers that are included in the RB, the number of symbols within the TTI, the symbol length, the Cyclic Prefix (CP) length, and the like can be changed in various ways.

In a case where articles, such as "a," "an," and "the" in English, for example, are added in the present disclosure by translation, nouns following these articles may have the same meaning as used in the plural.

In the present disclosure, the expression "A and B are different" may mean that "A and B are different from each other". Note that, the expression may also mean that "A and B are different from C". The expressions "separated" and "coupled" may also be interpreted in the same manner as the expression "A and B are different".

(Variations and the Like of Aspects)

The aspects and embodiment described in the present disclosure may be independently used, may be used in combination, or may be switched and used along the execution. Further, notification of predetermined information (for example, notification indicating "it is X") is not limited to explicit notification, and may be performed implicitly (for example, by not notifying the predetermined information).

While the present disclosure has been described in detailed, it is obvious to those skilled in the art that the present disclosure is not limited to the embodiment described in the present disclosure. Modifications and variations of the aspects of the present disclosure can be made without departing from the spirit and the scope of the present disclosure defined by the description of the appended claims. Therefore, the description in the present disclosure is intended for exemplary description and does not limit the present disclosure in any sense.

INDUSTRIAL APPLICABILITY

An aspect of the present disclosure is useful for, for example, a radio communication system.

REFERENCE SIGNS LIST

10 Base station
20 Terminal
101, 202 Transmission section
102, 201 Reception section
103, 203 Control section

The invention claimed is:

1. A terminal, comprising:
  a receiver that receives a higher layer signaling on a configuration of media access control (MAC); and
  a processor that ignores an uplink (UL) grant whose prioritization is configured as indicated in the higher layer signaling, based on a New Data Indicator (NDI) transmitted with the UL grant indicating a retransmission in MAC and a determination that the UL grant is not a prioritized UL grant,
  wherein the processor determines that the UL grant is the prioritized UL grant based on the UL grant being a configured UL grant, and determines that the UL grant is a de-prioritized UL grant based on the UL grant being a dynamic UL grant that overlaps with a configured UL grant.

2. The terminal according to claim 1, wherein the processor determines, based on the UL grant not being a prioritized UL grant, that a media access control protocol data unit (MAC PDU) has been obtained, in a case other than the retransmission.

3. The terminal according to claim 1, wherein the processor newly transmits a media access control protocol data unit (MAC PDU) when the UL grant is a prioritized UL grant in a case other than the retransmission.

4. The terminal according to claim 1, wherein the processor determines that the UL grant is the prioritized UL grant based on the UL grant being a dynamic UL grant, and determines that the UL grant is a de-prioritized UL grant based on the UL grant being a configured UL grant that overlaps with a dynamic UL grant.

5. A radio communication method, comprising:

receiving, by a terminal, a higher layer signaling on a configuration of media access control (MAC); and ignoring, by the terminal, an uplink (UL) grant whose prioritization is configured as indicated in the higher layer signaling, based on a New Data Indicator (NDI) transmitted with the UL grant indicating a retransmission in MAC and a determination that the UL grant is not a prioritized UL grant, wherein the terminal determines that the UL grant is the prioritized UL grant based on the UL grant being a configured UL grant, and determines that the UL grant is a de-prioritized UL grant based on the UL grant being a dynamic UL grant that overlaps with a configured UL grant.

6. A radio communication system comprising a terminal and a base station, wherein, the base station includes a transmitter that transmits a higher layer signaling on a configuration of media access control (MAC), and the terminal includes:

a receiver that receives the higher layer signaling from the base station; and a processor that ignores an uplink (UL) grant whose prioritization is configured as indicated in the higher layer signaling, based on a New Data Indicator (NDI) transmitted with the UL grant indicating a retransmission in MAC and a determination that the UL grant is not a prioritized UL grant, wherein the processor determines that the UL grant is the prioritized UL grant based on the UL grant being a configured UL grant, and determines that the UL grant is a de-prioritized UL grant based on the UL grant being a dynamic UL grant that overlaps with a configured UL grant.

* * * * *